United States Patent [19]

Meyer

[11] Patent Number: 5,433,659
[45] Date of Patent: Jul. 18, 1995

[54] AUTOMATED LEG SHEAR WITH STERILIZATION STATION

[75] Inventor: Philip G. Meyer, Plainview, Tex.

[73] Assignee: Jarvis Products Corporation, Middletown, Conn.

[21] Appl. No.: 224,147

[22] Filed: Apr. 7, 1994

[51] Int. Cl.⁶ .............................................. A22B 5/00
[52] U.S. Cl. .................................. 452/167; 452/163; 30/228
[58] Field of Search ................. 452/167, 166, 263, 64; 30/228, 241, 180

[56] References Cited

U.S. PATENT DOCUMENTS

| | | | |
|---|---|---|---|
| 3,405,423 | 10/1968 | Vertegaal | 17/11 |
| 3,488,797 | 1/1970 | Dirks | 17/23 |
| 3,696,464 | 10/1972 | Dillon et al. | 452/167 |
| 3,816,874 | 6/1974 | Jahnke | 452/167 |
| 3,988,803 | 11/1976 | Hamark | 452/163 |
| 3,990,126 | 11/1976 | Ochylski | 17/1 |
| 4,026,028 | 5/1977 | Green | 30/233 |
| 4,098,155 | 7/1978 | Insolio | 83/8 |
| 4,245,372 | 1/1981 | Messner | 452/167 |
| 4,627,167 | 12/1986 | Karubian et al. | 30/228 |
| 4,635,317 | 1/1987 | van der Eerden | 452/167 |
| 4,653,147 | 3/1987 | van der Eerden | 452/167 |
| 4,841,602 | 6/1989 | van der Hoorn et al. | 17/23 |
| 5,083,971 | 1/9192 | Karubian et al. | 452/167 |
| 5,180,329 | 1/1993 | Meyer | 452/166 |

FOREIGN PATENT DOCUMENTS 2117224  10/1983  United Kingdom .
3529205  2/1987  United Kingdom .

Primary Examiner—Willis Little
Attorney, Agent, or Firm—DeLio & Peterson

[57] ABSTRACT

An apparatus for automatically shearing the leg from a carcass moving along a carcass rail includes an arm having a first end pivotally attached to a support structure and a second end attached to a shearing assembly. The arm swings the shearing assembly out of a sterilization chamber remote from the carcass rail to a position along the carcass rail to shear the leg from the carcass. In a first embodiment, the shearing assembly shears a carcass leg projecting perpendicular to the carcass rail. In a second embodiment, the shearing assembly shears a carcass leg that is parallel to the rail. After the leg is sheared from the carcass, the arm swings the shearing assembly into the sterilization chamber for cleaning. The cleaning process takes place within the remote chamber thereby preventing contamination of carcasses on the carcass rail.

21 Claims, 4 Drawing Sheets

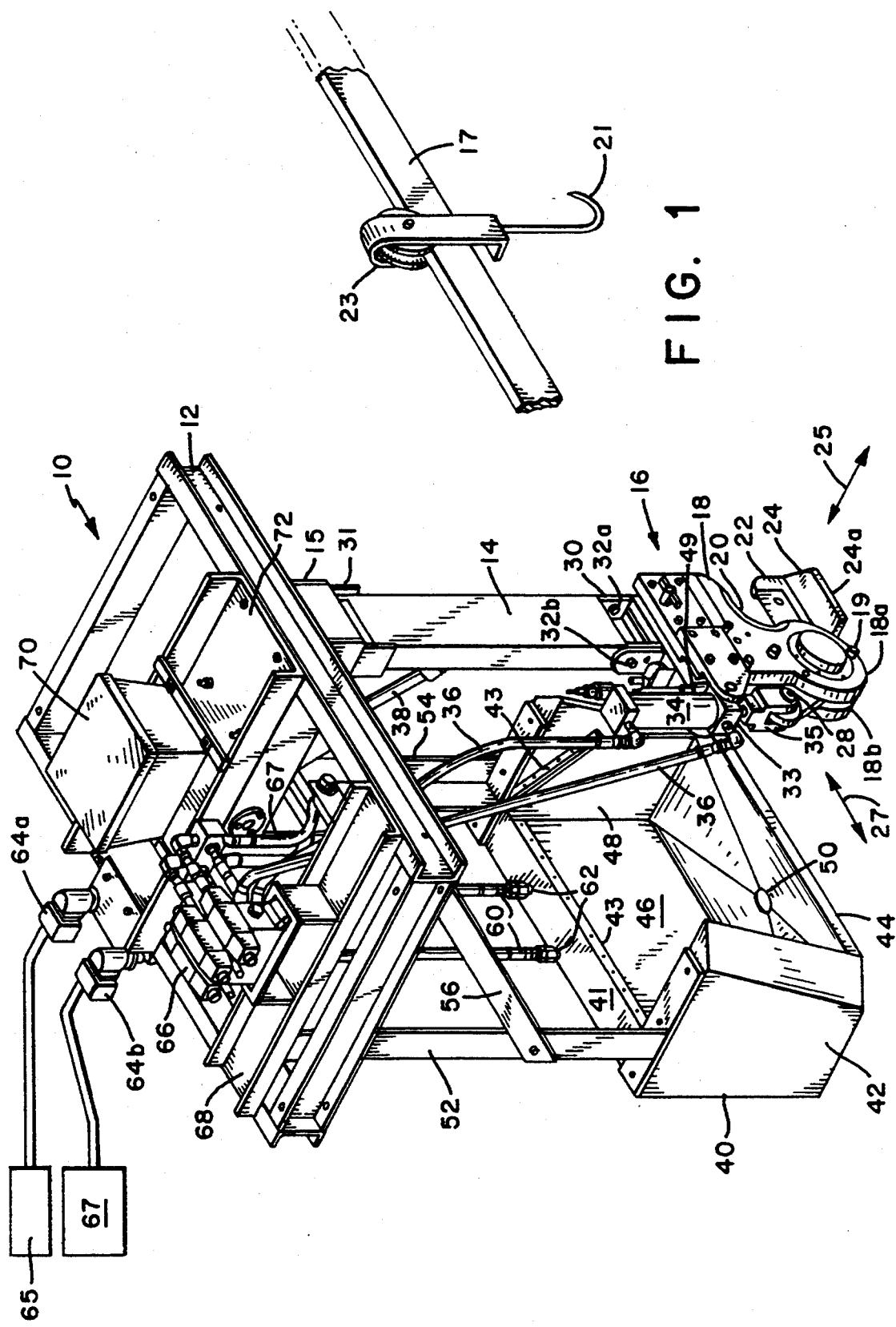

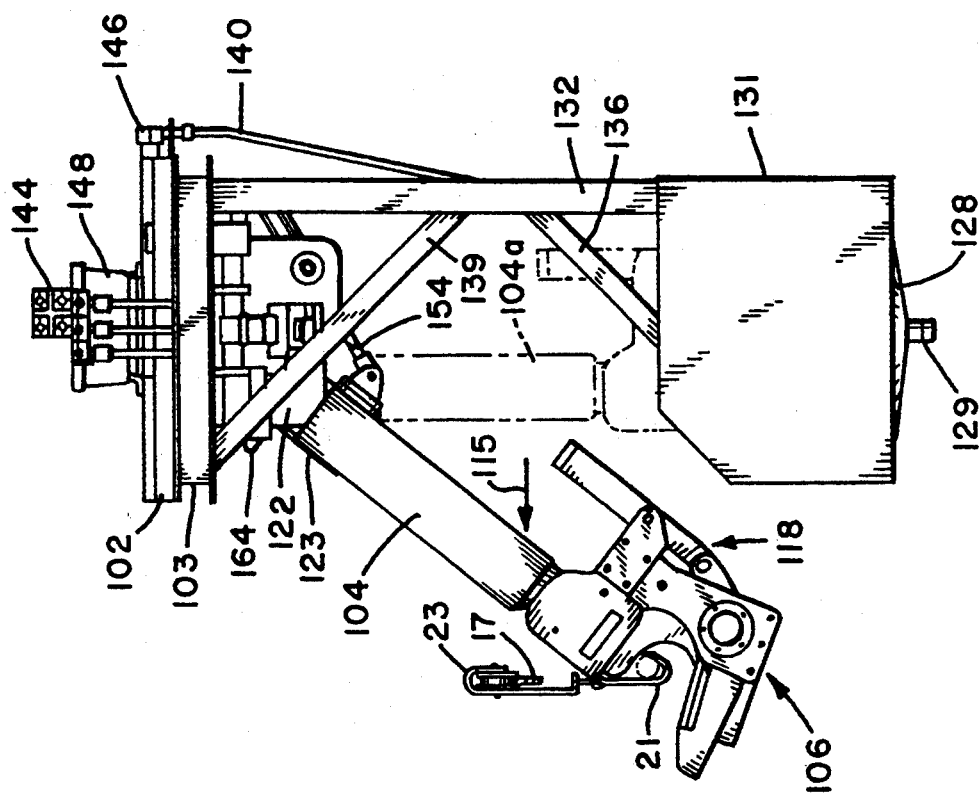
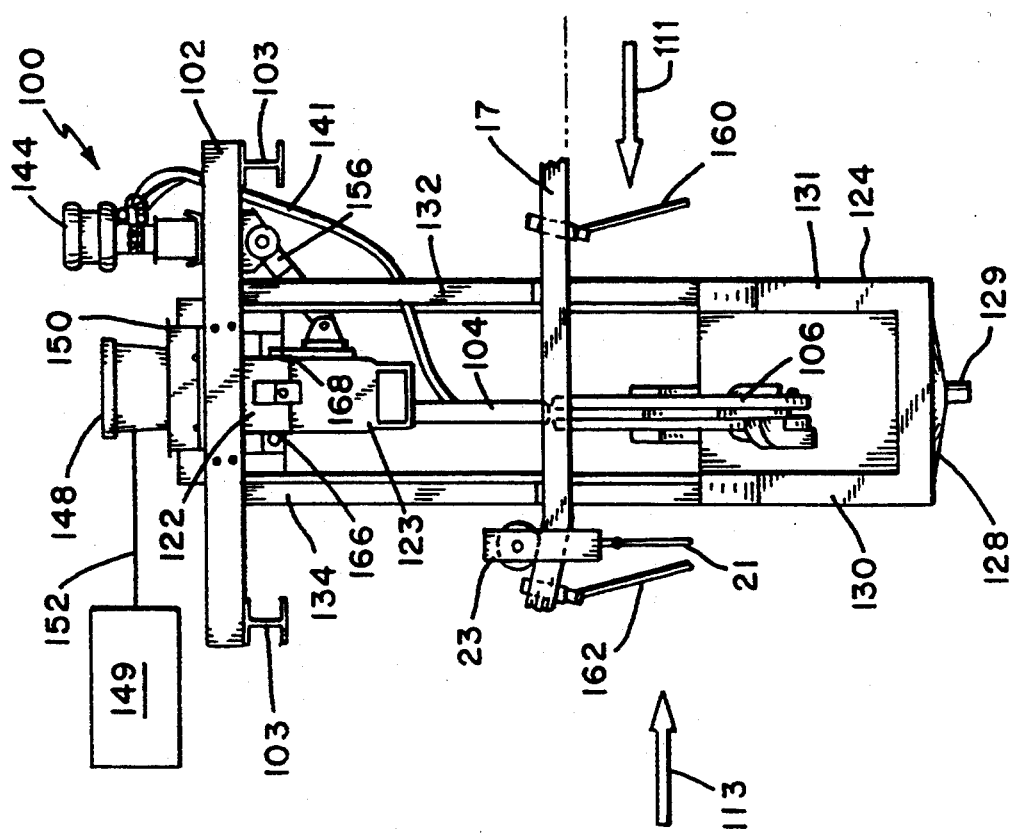

AUTOMATED LEG SHEAR WITH STERILIZATION STATION

BACKGROUND OF THE INVENTION

1. Field of the Invention

This invention relates to a device for shearing the legs from meat carcasses, and more particularly, to an automatic shear which positions a shearing blade relative to the leg on a carcass moving along on an overhead carcass rail, actuates the shearing assembly to shear the leg from the carcass and then sterilizes the shearing assembly prior to shearing the leg from the next carcass on the carcass rail.

2. Description of Related Art

In a meat packing facility, animal carcasses are suspended from their hind legs on hooks carried in trolleys which roll along an overhead carcass rail. The trolleys are continuously driven along the carcass rail to move the carcasses through the facility from one processing station to another. One step in the processing requires the removal of the hind legs from the suspended carcass. It is also desirable to sterilize the cutting or shearing assembly after operation upon each carcass. However, sterilization can lead to secondary contamination of the meat carcasses if sterilization fluid contacts the carcasses. Automated shearing of carcass legs is desirable. However, a perceived problem which has been an impediment to the development of such automated systems is the situation wherein a leg is not completely sheared off of the carcass and the shearing blades become locked onto the carcass. Such a situation can cause severe damage to the shearing or cutting apparatus resulting in breakdown of the apparatus. Such breakdowns are detrimental to the productivity of meat processing plants and account for high maintenance costs. Furthermore, if apparatus downtime is significant, contamination of the carcasses may occur.

Bearing in mind the problems and deficiencies of the prior art, it is therefore an object of the present invention to provide a new and improved leg shearing apparatus that is automated.

It is another object of the present invention to provide a new and improved carcass leg shearing apparatus which provides for sterilization of the cutting shears without contaminating the carcasses.

It is a further object of the present invention to provide a new and improved carcass leg shearing apparatus that prevents damage to the leg shearing apparatus if the leg is not completely sheared off the carcass.

It is yet another object of the present invention to provide a new and improved shearing apparatus that can be manufactured at a reasonable cost.

SUMMARY OF THE INVENTION

The above and other objects, which will be apparent to those skilled in the art, are achieved in the present invention which is directed to an apparatus for automatically shearing the leg from a carcass comprising a support structure adapted for mounting near a carcass rail, an arm having a first end and a second end, the first end being pivotally attached to the support structure, a shearing assembly attached to the second end of the arm, the shearing assembly including at least one shearing blade moveable in a shearing plane between an open and a closed shearing position, an arm driver for moving the arm relative to the support structure, a shearing blade driver for moving the shearing assembly from an open position to a closed position so as to shear the leg from the carcass, and a control system connected to control the arm driver and the shearing blade driver to move the arm to a predetermined location relative to the carcass rail and to move the shearing assembly from the open to the closed position to shear the leg from the carcass.

In another aspect, the present invention is directed to an apparatus for automatically shearing the leg from a carcass, wherein the carcass leg projects perpendicular to the carcass rail comprising, a support structure adapted for mounting near a carcass rail, an arm having a first end and a second end, the first end being pivotally attached to the support structure, a shearing assembly attached to the second end of the arm, the shearing assembly including at least one shearing blade moveable in a shearing plane between an open and a closed position, the shearing plane being substantially parallel to the carcass rail, a sterilization chamber remote from the carcass rail for sterilizing the shearing assembly and configured in such a manner so as to prevent the sterilization fluid from contaminating the carcasses on the carcass rail, a shearing blade driver for moving the shearing assembly from an open shearing position to a closed shearing position so as to shear the leg from the carcass, and an arm driver for moving the arm relative to the support structure. The movement of the arm includes movement between the sterilization chamber and a predetermined location adjacent the carcass rail wherein the movement is substantially perpendicular to the carcass rail. The shearing assembly is retracted into the chamber in order to be sterilized after shearing a leg from a carcass.

In a further aspect, the present invention is directed to an apparatus for automatically shearing the leg from a carcass wherein the carcass leg projects parallel to the carcass rail comprising a support structure adapted for mounting near a carcass rail, an arm having a first end and a second end, the first end being swingedly attached to the support structure, a shearing assembly attached to the second end of the arm, the shearing assembly including at least one shearing blade moveable in a shearing plane between an open and a closed shearing position, the shearing plane being substantially perpendicular to the carcass rail, a sterilization chamber remote from the carcass rail for sterilizing the shearing assembly, the chamber being configured in such a manner so as to prevent the sterilization fluid from contaminating the carcasses on the carcass rail, a shearing blade driver for moving the shearing assembly from an open shearing position to a closed shearing position so as to shear the leg from the carcass, a first arm driver for moving the arm relative to the support structure, the first arm driver moving the arm from the chamber to a predetermined location adjacent the carcass rail, the initial movement of the arm being perpendicular to the carcass rail, and a second arm driver for moving the arm relative to the support structure, the second arm driver moving the arm parallel to the carcass rail and toward the carcass on the carcass rail, the arm continually moving toward the carcass as the shearing assembly shears the leg off the carcass, the second arm driver thereafter moving the arm parallel to and away from the carcass after the leg is sheared off the carcass, the first arm driver moving the arm perpendicular to and away from the carcass rail into the sterilization chamber for sterilizing the shearing assembly.

BRIEF DESCRIPTION OF THE DRAWINGS

For a fuller understanding of the invention, reference is made to the following description taken in connection with the accompanying drawings in which:

FIG. 1 is a perspective view of a first embodiment of the leg shearing apparatus of the present invention.

FIG. 5 is a front elevational view of the leg shearing apparatus depicted in FIG. 4.

FIG. 6 is a side elevational view of the leg shearing apparatus depicted in FIG. 4.

DESCRIPTION OF THE PREFERRED EMBODIMENTS

First Embodiment

Figure 3:
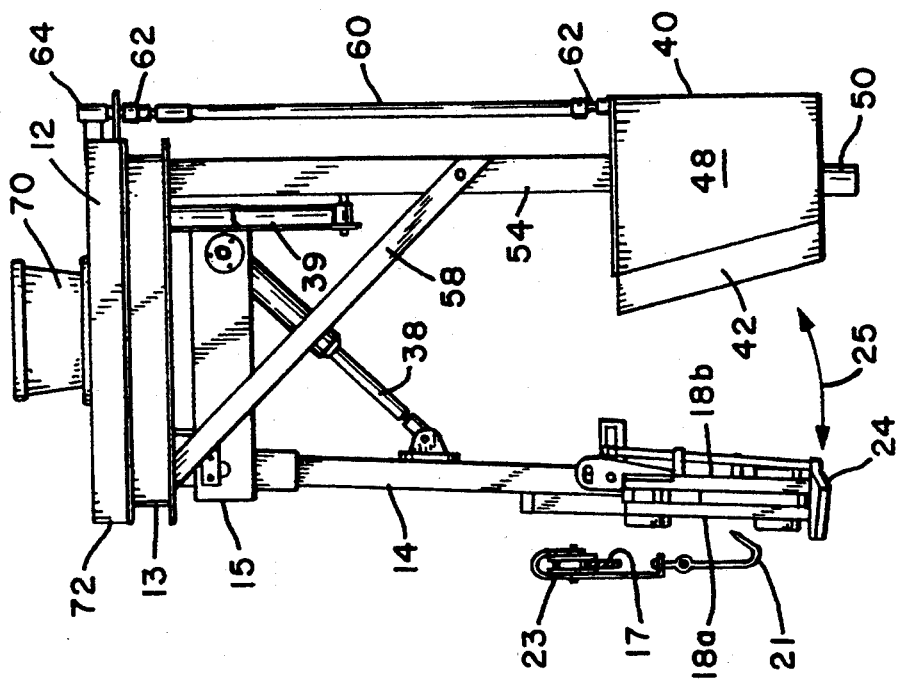
FIG. 3 is a side elevational view of the leg shearing apparatus depicted in FIG. 1.
Figure 2:
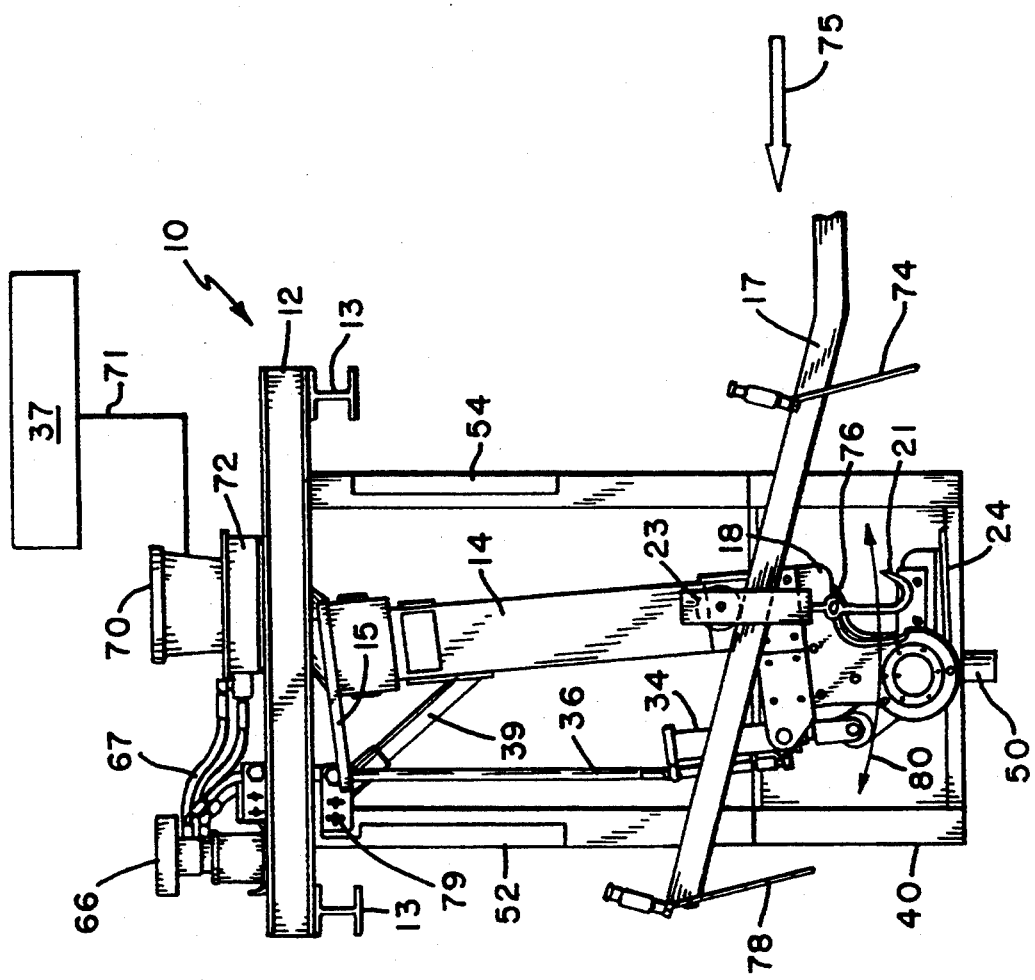
FIG. 2 is a front elevational view of the leg shearing apparatus depicted in FIG. 1.

The first embodiment of the present invention, shown in FIGS. 1-3, is suitable for use when the carcass leg that is to be sheared is generally perpendicular to carcass rail 17. The assembled basic components of the first embodiment automatic leg shearing apparatus 10 comprises generally a frame assembly 12, arm 14, shearing assembly 16 and sterilization tank 40. Arm 14 is attached to bracket 31 which is pivotally attached to support member 15. Thus, arm 14 can swing or pivot in the direction indicated by arrow 25. Arrow 25 designates a first swing axis which is substantially perpendicular to rail 17. Support member 15 is pivotally attached to frame 12 and enables arm 14 to also swing or pivot in the direction indicated by arrow 27. Arrow 27 designates a second swing axis which is substantially parallel to rail 17. Arm driver 38 comprises a linear hydraulic cylinder driver and is connected between arm 14 and the rear portion of member 15 in order to swing or pivot arm 14 in the direction indicated by directional arrow 25. The flow of hydraulic fluid to arm driver 38 is controlled by electrically activated hydraulic valve network 66. Network 66 is mounted to support plate 68 which is attached to frame 12. Thus, arm driver 38 swings or pivots arm 14 between a position adjacent the carcass rail and the interior of sterilization tank 40. The movement to and from the position adjacent rail 17 is substantially perpendicular to carcass rail 17. The extent of the outward movement of arm 14 toward rail 17 is terminated by the end of the stroke of the cylinder of driver 38. Referring to FIG. 2, damper 39 acts as a shock absorber and stabilizes the movement of arm 14 in the direction indicated by arrow 27.

Shearing assembly 16 comprises frame 18 which comprises front plate 18a, rear plate 18b, fixed shearing blade 20 and opposed shearing blade 22 pivotally attached to frame 18. Blades 20 and 22 define a shearing plane which is substantially parallel to rail 17. Bolts 19 fasten plates 18a, 18b together. Bracket 30 is attached to frame 18 and connects frame 18 to the lower portion of arm 14. Bracket 30 is attached to arm 14 via pins or bolts 32a, 32b. Shearing blade 22 is moved from an open shearing position to a closed shearing position by shearing blade driver 33 which is mounted to frame 18. Driver 33 comprises a linear hydraulic cylinder driver which includes hydraulic cylinder 34. Clevis bracket 35 is attached to the lower end of cylinder 34. Blade 22 is pivotally attached to clevis bracket 35 via clevis pin 28. Hydraulic piping 36 contains hydraulic fluid therein for producing pressure within hydraulic cylinder 34 in order to move arm 14. The flow of hydraulic fluid through piping 36, and hence into cylinder 34, is controlled by electrically activated hydraulic valve network 66. Valve network 66 is controlled by control system 37 (see FIG. 2), the function of which will be described in detail below. Sensor 49, which is mounted to driver 33, indicates whether blade 22 is in an open shearing position or closed shearing position.

Referring to FIGS. 1 and 3, sterilization chamber or tank 40 is remote from rail 17 and is attached to frame 12 via vertical support beams 52, 54 and brackets 56, 58. Tank 40 is comprised of upstanding wall portions 42, 46, 48 and bottom surface 44. Perforated conduit 43 is mounted to walls 42, 46, 48 within tank 40 and is fluidly connected to fittings 62. Pressurized air source 65 and water source 67 are connected to inlets 64a and 64b, respectively. Inlets 64a and 64b are in fluid communication with hoses 60 which are fitted to top portion 41 of tank 40 via hose fittings 62. Pressurized water is emitted from the perforations in conduit 43 so as to sterilize shearing assembly 16 after a leg is sheared from a carcass. As used herein, the term "sterilization" refers to cleaning the shearing assembly so as to prevent contamination to the carcasses. Bottom surface 44 has a drain opening 50 in the center thereof and is pitched toward opening 50 so as to allow any expended water to exit tank 40 via opening 50. Preferably, the water emitted from conduit 43 is heated to a high temperature. Any non-toxic sterilization or cleaning fluids, other than water, may also be used to sterilize the shearing assembly. Since the sterilization process takes place within the interior of tank 40, contamination of the carcasses on the carcass rail is prevented.

Referring to FIG. 2, control system 37 comprises programmable logic circuitry which is responsive to the output signals of sensors 49, 74, 76, 78 and 79. The outputs of each of the above-mentioned sensors are wired to corresponding terminals in junction box 70. Junction box 70 is mounted to support plate 72 which is attached to frame 12. Cable 71 connects the terminals in junction box 70 to control system 37. Control system 37 is also responsive to the position of sensing wand or position sensor 24, the function of which will be discussed in greater detail below. Control system 37 also has provisions for manual operation.

Safety sensor 74 emits a signal to control system 37 when it detects the presence of a carcass on the rail. Sensor 74 ensures that the blade 22 will close only if a carcass is on the rail adjacent shearing assembly 16. This safety feature prevents injury to personnel who are operating shearing apparatus 10. Shearing sensor 76 is mounted to shearing assembly 16 adjacent the shearing plane. Sensor 76 sends a signal to control system 3 7 when it contacts a carcass leg within the shearing plane. Thus, blade 22 will close only if sensors 74 and 76 emit signals indicating the presence of a carcass on the rail adjacent shearing assembly 16 and a carcass leg within the shearing plane, respectively. The signal produced by sensor 76 also causes control system 37 to initiate a timed process which will be discussed below.

Deactivation sensor 78 emits a signal when it detects the presence of shearing assembly 16 thereby indicating that arm 14 has swung its maximum limit. In a preferred embodiment, the signal emitted by sensor 78 will automatically shut down carcass rail 17 and shearing apparatus 10 so as to prevent damage to the latter.

A limit switch or deactivation sensor 79 is mounted to support member 15 and is actuated when arm 104, and hence member 15, swings or pivots the maximum distance determined by damper 39. When activated, switch 79 emits a signal to control system 37. In response to the signal from switch 79, control system 37 will effect a shutdown of carcass rail 17 and shearing apparatus 10. Thus, if the attempt to shear the carcass leg is unsuccessful, and the moving carcass pulls arm 14 and shearing assembly 16 in the direction indicated by arrow 80, (the second swing axis), sensors 78 and 79 will deactivate rail 17 and shearing apparatus 10 if arm 14 and shearing assembly 16 swing the maximum distance.

Referring to FIG. 1, sensing wand or position sensor 24 is attached to the bottom portion of frame 18 of shearing assembly 16. A compression spring (not shown) is interposed between a portion of wand 24 and a proximity switch mounted to frame 18. When a carcass initially contacts wand 24, wand 24 moves in such a manner that it compresses the spring and activates the proximity switch. The switch, when activated, produces a signal to control system 37. In response, control system 37 sends a signal to arm driver 38 in order to adjust the position of shearing assembly 16 to a desired horizontal location relative to that particular carcass. The desired horizontal location is achieved when the carcass contacts wand 24 without compressing the spring and activating the switch. The horizontal adjustment of shearing assembly 16 ensures that the carcass leg is correctly positioned within the shearing plane and guarantees consistent and precision cuts for carcasses of varying sizes.

When sensor 76 indicates that there is a carcass leg within the shearing plane, control system 37 initiates a timed process comprising the following timed, sequenced steps: closing blade 22 so as to shear the carcass leg from the carcass, opening blade 22, retracting arm 14 so as to position shearing assembly 16 within tank 40, sterilizing shearing assembly 16 and moving arm 14 so as to position shearing assembly 16 adjacent carcass rail 17 for shearing the leg from the next carcass. When shearing assembly 16 is positioned adjacent carcass rail 17, the timed process ends and is not initiated again until sensor 76 indicates that a leg of the next carcass is within the shearing plane.

A proximity switch (not shown) may optionally be utilized with shearing assembly 16 which will effect an opening of blade 22 in the event of an unsuccessful cut and the jaws (blades 20, 22) become fixed on the carcass.

Other types of linear driver mechanisms, such as pneumatic drivers and mechanical screw mechanisms or geared drivers might also be used in place of the linear hydraulic cylinder drivers discussed above.

Operation of First Embodiment

Referring to FIGS. 1–3, each carcass is attached to a corresponding carcass hook 21. Each hook 21 is attached to a corresponding hook support bracket or trolley 23 which is slidably mounted to carcass rail 17. The carcasses move along rail 17 in a direction indicated by arrow 75. When the trolley carrying the carcass contacts sensor 74, sensor 74 outputs a signal to control system 37. This signal indicates that a carcass is on rail 17 adjacent shearing apparatus 10. At this time, shearing assembly 16 is outside tank 40 and is positioned adjacent rail 17. When the carcass initially contacts wand 24, the force produced by the contact compresses the compression spring (mounted on assembly 16) thereby activating the switch mounted on shearing assembly 16. When activated, the switch sends a signal to control system 37. In response, control system 37 adjusts the position of shearing assembly 16 via driver 38 until the carcass contacts wand 24 without compressing the compression spring and activating the switch. When the spring is no longer compressed, shearing assembly 16 is at the desired horizontal position relative to that particular carcass. The final position of shearing assembly 16 prior to shearing the leg off the carcass is dependent upon the size of the particular carcass. The positional adjustment of shearing assembly 16 prior to shearing the carcass leg ensures consistent cuts, with respect to cut depth, for all the carcasses. When the carcass leg breaks the shearing plane and contacts sensor 76, sensor 76 emits a signal to control system 37 which initiates the aforementioned timed-process. Upon initiation of the timed process, control system 37 emits a control signal to valve network 66 which activates driver 33. The activation of driver 33 effects a closure of blade 22 which shears the leg from the carcass. After the leg is sheared off the carcass, sensor 49 and control system 37 cooperate to retract arm 14 in order to position shearing assembly 16 within sterilization tank 40 for sterilization prior to shearing the leg off the next carcass. After shearing assembly 16 is sterilized, control system 37 sends a signal to valve network 66 to enable driver 38 to move arm 14 outward from tank 40 so as to position shearing assembly 16 adjacent carcass rail 17. The timed process terminates and does not restart until sensor 76 is activated by the leg of the next carcass.

In the event the cut is not complete or successful and the shearing assembly remains locked on the carcass, the carcass will continue to move upon the carcass rail 17 pulling along with it arm 14 and shearing assembly 16. When arm 14 swings to its maximum limit, sensor 78 and switch 79 emit signals to control system 37 which causes the carcass rail and the shearing assembly to shutdown. If the aforementioned-additional proximity switch is used with shearing assembly 16, then the jaws, defined by blades 20 and 22, would automatically open after a predetermined amount of time has elapsed during which the jaws remained closed. The proximity switch would be wired to control system 37, in a manner similar to the other sensors and switches mentioned above.

Second Embodiment

Figure 4:
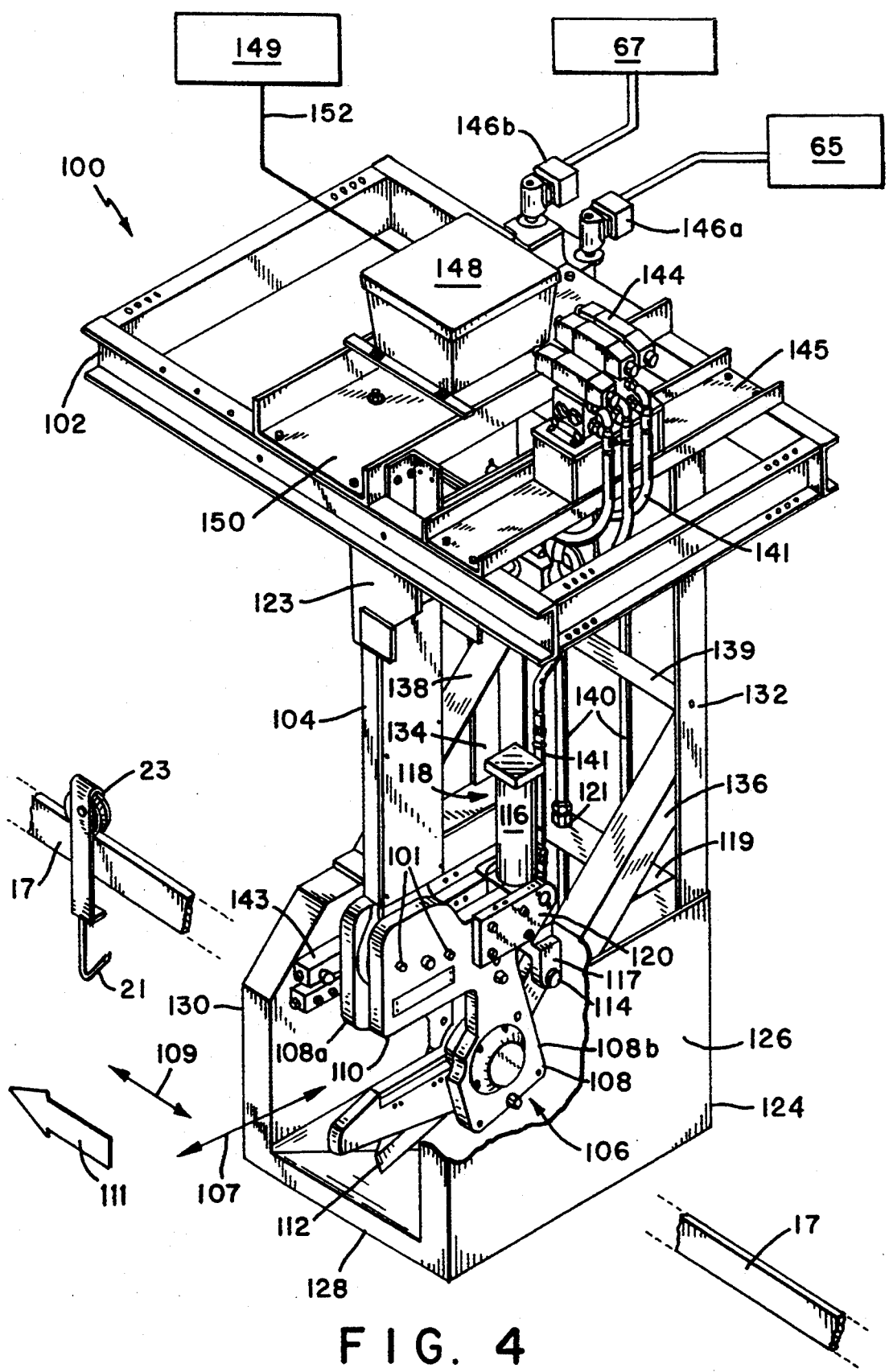
FIG. 4 is a perspective view of a second embodiment of the present invention.

The second embodiment of the present invention, shown in FIGS. 4–6, is suitable for use when the carcass leg that is to be sheared is generally parallel to carcass rail 17. The assembled basic components of a second embodiment 100 of the present invention comprises generally a frame assembly 102, arm 104, shearing assembly 106 and sterilization tank 124. Arm 104 is attached to bracket 123 which is pivotally attached to arm support member 122 thereby enabling arm 104 to pivot in the direction indicated by directional arrow 107. Arrow 107 designates movement that is substantially perpendicular (the first swing axis) to rail 17. Arm 104 is pivoted, as indicated by arrow 107, by arm driver 154 (see FIG. 6) which comprises a linear hydraulic cylinder driver. Support member 122 is pivotally attached to frame 102 in a manner such that arm 104 can also pivot in a direction indicated by arrow 109. Arrow 109 designates movement that is substantially parallel (the second swing axis) to rail 17. Arm 104 is pivoted, as indicated by arrow 109, by arm driver 156 which comprises a linear hydraulic cylinder driver. The flow of hydraulic fluid through piping 141 and to the hydraulic cylinders of drivers 154 and 156 is controlled by electronically activated hydraulic valve network 144. Network 144 is mounted to support plate 145 which is attached to frame 102. Network 144 is comprised of a series of electronically actuated hydraulic valves that are controlled by control system 149.

Shearing assembly 106, which is attached to the lower end of arm 104, comprises frame 108, fixed shearing blade 110 and opposed shearing blade 112. Frame 108 is comprised of plate 108a and 108b which are bolted together. Blade 112 is pivotally mounted between plates 108a and 108b. Blades 110 and 112 define a shearing plane which is substantially perpendicular to carcass rail 17. Shearing blade 112 is moved from an open shearing position to a closed shearing position by a shearing blade driver system indicated generally at 118, which is similar in construction and operation as driver 33 in FIG. 1. Screws 101 can be adjusted so as to vary the angle of the shearing assembly with respect to arm 104. Clevis pin 114 pivotally attaches blade 112 to hydraulic cylinder 116. A sensor (not shown) is operatively connected to driver 118 to indicate whether blade 112 is in an open shearing position or closed shearing position. The flow of hydraulic fluid through piping 141 and into shearing blade driver 118 is also controlled by electrically actuated hydraulic valve network 144.

Sterilization chamber or tank 124 is remote from carcass rail 17 and is supported by frame 102 via connecting vertical support beams 132, 134 and brackets 136, 138. Tank 124 is comprised of upstanding side wall portions 126, 130, backwall 131 and bottom 128. Pressurized air source 65 and water source 67 are connected to inlets 146a and 146b, respectively. Inlets 146a and 146b are fluidly connected to hoses 140 which are fitted to top portion 119 of tank 124 via fittings 121. Fittings 121 fluidly connect pipes 140 to nozzles 143 which are mounted within tank 124 on walls 126, 130 and 131. Nozzles 143 emit pressurized water which sterilizes shearing assembly 106 after a leg is sheared from a carcass. Bottom 128 has drain opening 129 formed in the center thereof and is pitched to allow any expended water to move toward and exit through drain 129. Since sterilization of the shearing assembly occurs within tank 124, none of the carcasses on the carcass rail are contaminated. Preferably, the water emitted from nozzles 143 is heated to a high temperature. Any non-toxic sterilization or cleaning fluids, other than water, may also be used to sterilize the shearing assembly.

Referring to FIG. 5, control system 149 comprises programmable logic circuitry which is responsive to the output signals of sensors 160 and 162. The outputs of the sensors are wired to corresponding terminals in junction box 148. Junction box 148 is mounted to support plate 150 which is attached to frame 102. Cable 152 connects the terminals in junction box 148 to control system 149. Control system 149 also has manual override provisions thereby allowing shearing apparatus 100 to be operated in a manual mode. The function of safety sensor 160 is identical to that of sensor 74 of the first embodiment and thus ensures that blade 112 will close only if a carcass is on the rail adjacent shearing apparatus 100. Sensor 162 is activated when it contacts trolley 23 which is moving along rail 17. When such contact occurs, sensor 162 sends a signal to control system 149 which then initiates a timed process. Upon initiation of the timed process, control system 149 activates arm driver 154 so as to move arm 104 out of tank 124 and in a direction that is substantially perpendicular to carcass rail 17 (indicated by arrow 115 in FIG. 6). The forward movement of arm 104 is terminated when limit switch 164 is activated. The activation of switch 164 also indicates the end of the stroke of the cylinder of driver 154. When switch 164 is activated, it sends a signal to control system 149 to activate arm driver 156 to move arm 104 toward the carcass and in a direction that is substantially parallel to carcass rail 17 (indicated by arrow 111 in FIG. 5) so as to cause the carcass leg to break the shearing plane. In accordance with the timed process, the shearing assembly 106 continues to move toward the carcass after the carcass leg breaks the shearing plane. Control system 149 then activates drive 118 to shear the leg off the carcass. Thus, the distance the arm 104 travels is determined according to the timed process. Control system 149 activates arm driver 156 to pull arm 104 back and away from the carcass (indicated by arrow 113 in FIG. 5) and in a direction substantially parallel to carcass rail 17. Arm driver 156 continues to pull arm 104 back until switch 168 is activated. When activated, switch 168 sends a signal to control system 149 which activates arm driver 154 to retract arm 104 into sterilization tank 124. Once shearing assembly 106 is positioned within tank 124, jet streams of water are emitted from nozzles 143 to sterilize shearing assembly 106. After shearing assembly 106 is sterilized, the timed process is complete and is not initiated again until sensor 162 is contacted by the trolley carrying the next carcass.

Referring to FIG. 5, deactivation sensor or switch 166 functions in a manner similar to switch 79 shown in FIG. 2 and thus effects a system shutdown in the event of an unsuccessful cut. Similar to the first embodiment, an additional switch or sensor can be used on shearing assembly 106 to effect an opening of the jaws, defined by blades 110 and 112, in the event the jaws become locked on a carcass.

Operation of Second Embodiment

Referring to FIGS. 4-6, carcasses move along the carcass rail in the direction indicted by arrow 111. When sensor 160 detects that a carcass is adjacent shearing assembly 106, sensor 160 emits a signal to control system 149 which stores this signal. When trolley 23 contacts sensor 162, sensor 162 emits a signal to control signal 149. In response to the signals from sensors 160 and 102, control system 149 initiates the timed process. Upon initiation of the timed process, control system 149 sends a signal to hydraulic valve network 144 to effect an increase in hydraulic pressure in arm driver 154. Arm driver 154 then moves arm 104 out of tank 124 and toward carcass rail 17. The movement of arm 104 during this phase is substantially perpendicular to the carcass rail. The maximum distance arm 104 can move is limited by the end of the stroke of the cylinder of arm driver 154. Proximity switch 164 emits a signal to control system 149 when arm 104 swings to its maximum distance during its initial perpendicular movement. When control system 149 receives the signal from switch 164, control system 149 sends a signal to valve network 144 which activates arm driver 156 to move arm 104 in the direction that the carcasses are travelling (indicated by arrow 111) which is substantially parallel to carcass rail 17. Driver 156 moves arm 104 toward the carcass so as to allow the carcass leg to break the shearing plane of shearing assembly 106. Once the carcass leg breaks the shearing plane, arm 104 continues to move in the direction indicated by arrow 111 to ensure that the cut is made at the appropriate spot on the carcass. The time allocated for the continued movement is determined by the timed process. The leg is then sheared off the carcass. Upon shearing the carcass leg, control system 149 emits a signal to activate driver 156 to pull arm 104 back from the carcass and in a direction indicated by arrow 113. Driver 156 continues to pull arm 104 back until switch 168 is activated, it sends a signal to control system 149 which sends the appropriate signals to valve network 144 in order to deactivate driver 156 and activate driver 154. Driver 154 then pulls arm 104 back so as to position shearing assembly 106 within tank 124. Once positioned within tank 124, shearing assembly 106 is sterilized by jet streams of water emitted by nozzles 143. Once sterilization is complete, the timed process ends and is not restarted until sensor 162 is activated.

If the cut is unsuccessful, the moving carcass will pull arm 104 with it as the carcass travels along rail 17. However, when arm 104 moves its maximum distance in the direction indicated by arrow 111, switch 166 is activated which emits a signal to control system 149 which shuts down carcass rail 17 and the shearing apparatus 100 in order to prevent damage to the latter.

It will thus be seen that the objects set forth above, among those made apparent from the preceding description, are efficiently attained and, since certain changes may be made in the above constructions without departing from the spirit and scope of the invention, it is intended that all matter contained in the above description or shown in the accompanying drawings shall be interpreted as illustrative and not in a limiting sense.

While the invention has been illustrated and described in what are considered to be the most practical and preferred embodiments, it will be recognized that many variations are possible and come within the scope thereof, the appended claims therefor being entitled to a full range of equivalents.

Thus, having described the invention, what is claimed is:

1. An apparatus for automatically shearing a leg from a carcass comprising:
   a support structure adapted for mounting near a carcass rail;
   an arm having a first end and a second end, said first end being pivotally attached to said support structure;
   a shearing assembly attached to said second end of said arm, said shearing assembly including at least one shearing blade movable in a shearing plane between an open shearing position and a closed shearing position;
   an arm driver for moving said arm relative to said support structure;
   a shearing blade driver for moving said shearing assembly from the open shearing position to the closed shearing position so as to shear the leg from the carcass;
   a sterilization chamber remote from said carcass rail for sterilizing said shearing assembly; and
   a control system connected to control said arm driver and said shearing blade driver to move said arm to a predetermined location relative to the carcass rail and to move said shearing assembly from the open shearing position to the closed shearing position to shear the leg from the carcass.

2. The apparatus of claim 1 further including:
   a sterilization fluid source for providing sterilization fluid to said sterilization chamber;
   said shearing assembly being retracted into said chamber after shearing a leg from a carcass, said chamber being configured in such a manner so as to prevent the sterilization fluid from contaminating the carcasses on the carcass rail.

3. The apparatus of claim 2 wherein said arm swings along a first swing axis between said chamber and a predetermined location adjacent the carcass rail.

4. The apparatus of claim 3 wherein said shearing plane is substantially parallel to the carcass rail.

5. The apparatus of claim 4 wherein said arm is freely movable along a second swing axis.

6. The apparatus of claim 3 wherein after the movement of said arm along said first swing axis, said control system controls said arm driver to move said arm along a second swing axis and toward the carcass on the carcass rail, said arm driver continually moving said arm toward the carcass as the shearing assembly shears the leg off the carcass, said shearing plane being substantially perpendicular to the carcass rail.

7. The apparatus of claim 6 wherein after the leg is sheared off the carcass, said control system controls said arm driver so as to move said arm along said second swing axis and away from the carcass, said control system thereafter controlling said arm driver so as to move said arm along said first swing axis and away from the carcass rail and into said sterilization chamber for sterilization of said shearing assembly.

8. The apparatus of claim 7 wherein said first swing axis is substantially perpendicular to the carcass rail, and said second swing axis is substantially parallel to the carcass rail.

9. The apparatus of claim 1 further including a shearing sensor connected to said control system for producing a signal indicating the presence of a carcass leg in the shearing plane.

10. The apparatus of claim 9 further including a safety sensor connected to said control system for producing a signal indicating the presence of a carcass on the carcass rail, said control system moving said shearing assembly from an open shearing position to a closed shearing position only upon detection of signals from said safety sensor and said shearing sensor.

11. The apparatus of claim 5 further including a deactivation sensor connected to said control system for producing a signal which causes the deactivation of said apparatus and said carcass rail when said arm moves a predetermined distance along said second swing axis.

12. The apparatus of claim 3 further including a position sensor connected to said control system for detecting the horizontal position of the shearing assembly relative to the carcass, said control system, upon receiving a signal from said position sensor, controlling said arm driver to move said shearing assembly to a predetermined position relative to the carcass.

13. An apparatus for automatically shearing a leg from a carcass wherein the carcass leg projects substantially perpendicular to the carcass rail comprising:
   a support structure adapted for mounting near a carcass rail;

an arm having a first end and a second end, said first end being pivotally attached to said support structure;

a shearing assembly attached to said second end of said arm, said shearing assembly including at least one shearing blade movable in a shearing plane between an open shearing position and a closed shearing position, said shearing plane being substantially parallel to the carcass rail;

a sterilization chamber remote from said carcass rail for sterilizing said shearing assembly, said chamber being connected to a sterilization fluid source and configured in such a manner so as to prevent the sterilization fluid from contaminating the carcasses on the carcass rail;

a shearing blade driver for moving said shearing assembly from an open shearing position to a closed shearing position so as to shear the leg from the carcass; and an arm driver for moving said arm relative to said support structure, said arm swinging substantially perpendicular to the carcass rail between said chamber and a predetermined location adjacent the carcass rail, said arm being freely movable substantially parallel to the carcass rail.

14. The apparatus of claim 13 further including a control system to control said shearing blade driver and said arm driver to move said shearing assembly from the open shearing position to the closed shearing position to shear the leg from the carcass, to retract said arm so as to position said shearing assembly in said chamber for sterilization, and to move said arm to a predetermined location relative to the carcass rail.

15. The apparatus of claim 14 further including:

a shearing sensor connected to said control system for producing a signal indicating the presence of a carcass leg in the shearing plane; and a safety sensor connected to said control system for producing a signal indicating the presence of a carcass on the carcass rail;

said control system moving said shearing assembly from an open shearing position to a closed shearing position only upon detection of signals from said safety sensor and said shearing sensor.

16. The apparatus of claim 14 further including a deactivation sensor connected to said control system for producing a signal which causes the deactivation of said apparatus and said carcass rail when said arm moves a predetermined distance substantially parallel to the carcass rail.

17. The apparatus of claim 14 further including a position sensor connected to said control system for detecting the horizontal position of the shearing assembly relative to the carcass, said control system, upon receiving a signal from said position sensor, controlling said arm driver to move said shearing assembly to a predetermined position relative to the carcass.

18. An apparatus for automatically shearing the leg from a carcass wherein the carcass leg projects substantially parallel to the carcass rail comprising:

a support structure adapted for mounting near a carcass rail;

an arm having a first end and a second end, said first end being swingedly attached to said support structure;

a shearing assembly attached to said second end of said arm, said shearing assembly including at least one shearing blade movable in a shearing plane between an open shearing position and a closed shearing position, said shearing plane being substantially perpendicular to the carcass rail;

a sterilization chamber remote from the carcass rail for sterilizing said shearing assembly, said chamber being configured in such a manner so as to prevent the sterilization fluid from contaminating the carcasses on the carcass rail;

a shearing blade driver for moving said shearing assembly from an open shearing position to a closed shearing position so as to shear the leg from the carcass;

a first arm driver for moving said arm relative to said support structure, said first arm driver moving said arm substantially perpendicular to the carcass rail between said chamber and a predetermined location adjacent the carcass rail, said first arm driver moving said shearing assembly into said chamber for sterilization; and a second arm driver for moving said arm relative to said support structure, said second arm driver moving said arm substantially parallel to the carcass rail and toward the carcass on the carcass rail, said arm continually moving toward the carcass as the shearing assembly shears the leg off the carcass, said second arm driver moving said arm substantially parallel to and away from the carcass after the leg is sheared off the carcass.

19. The apparatus of claim 18 further including a control system connected to control said first and second arm drivers and said shearing blade driver to move said arm to a predetermined location relative to the carcass rail, move said shearing assembly from the open shearing position to the closed shearing position to shear the leg from the carcass, and position said shearing assembly within said chamber for sterilization.

20. The apparatus of claim 19 further including a safety sensor connected to said control system for producing a signal indicating the presence of a carcass on the carcass rail, said control system controlling said first and second arm drivers to position said shearing position to a predetermined location for shearing the carcass leg, and moving said shearing assembly from an open shearing position to a closed shearing position only upon detection of a signal from said safety sensor.

21. The apparatus of claim 19 further including a deactivation sensor connected to said control system for producing a signal which causes the deactivation of said apparatus and said carcass rail when said arm moves a predetermined distance substantially parallel to the carcass rail.

* * * * *